United States Patent [19]

Lee et al.

[11] Patent Number: 5,767,919
[45] Date of Patent: Jun. 16, 1998

[54] REMOTE CONTROL METHOD AND VIDEO APPARATUS FOR PERFORMING THE SAME

[75] Inventors: Sang-su Lee, Suwon; Chang-wan Hong, Anyang, both of Rep. of Korea

[73] Assignee: SamSung Electronics Co.,Ltd., Kyungki-Do, Rep. of Korea

[21] Appl. No.: 381,238

[22] Filed: Jan. 31, 1995

[30] Foreign Application Priority Data

Jun. 25, 1994 [KR] Rep. of Korea ............... 1994-14744
Nov. 15, 1994 [KR] Rep. of Korea ............... 1994-29958

[51] Int. Cl.$^6$ ............................................. H04N 5/44
[52] U.S. Cl. ................... 348/569; 348/734; 395/156; 345/157
[58] Field of Search ............................. 348/569, 734, 348/563–565, 906; 345/160, 902, 157, 145, 146; 395/156, 154, 157; H04N 5/44

[56] References Cited

U.S. PATENT DOCUMENTS

| | | | |
|---|---|---|---|
| 5,204,947 | 4/1993 | Bernstein et al. | 345/146 |
| 5,302,968 | 4/1994 | Heberle | 348/734 |
| 5,349,460 | 9/1994 | Ogasahara | 348/734 |
| 5,367,316 | 11/1994 | Ikezaki | 348/734 |
| 5,425,140 | 6/1995 | Bloomfield et al. | 345/146 |
| 5,497,484 | 3/1996 | Potter et al. | 395/156 |
| 5,528,304 | 6/1996 | Cherrick et al. | 348/565 |
| 5,619,249 | 4/1997 | Billock et al. | 348/7 |

*Primary Examiner*—Glenton B. Burgess
*Attorney, Agent, or Firm*—Sughrue, Mion, Zinn, Macpeak & Seas, PLLC

[57] ABSTRACT

A remote control method for controlling a video apparatus such as a television or videocassette recorder includes the steps of displaying a cursor on a display screen in response to a movement of the remote controller; displaying a main menu according to a key input of the remote controller while a cursor is displayed on the display screen; selecting the desired main menu by moving the cursor and displaying a sub-menu belonging to the selected main menu while the main menu is displayed on the display screen; displaying a control menu belonging to the selected sub-menu when the desired sub-menu is selected by moving the cursor while the sub-menu is displayed; and performing the corresponding function when the desired function is selected by moving the cursor while the control menu is displayed, to thereby select the menu by a cursor and reduce the number of function keys of the remote controller, and thus easily control the video apparatus.

6 Claims, 7 Drawing Sheets

REMOTE CONTROL METHOD AND VIDEO APPARATUS FOR PERFORMING THE SAME

BACKGROUND OF THE INVENTION

The present invention relates to a remote control method and a video apparatus for performing the same, and more particularly, to a remote control method and video apparatus for displaying a menu including the functions of the video apparatus and in which menu selections are made in accordance with the movement of a cursor.

Many home appliances, including most video equipment (e.g., televisions and videocassette recorders), are generally provided with a remote controller having function keys. In addition, the number of function keys required for such a remote controller increases in proportion to the demand for various functions. Thus, the remote controller has numerous keys providing several tens of functions for satisfying this demand. However, the large number of keys requires users to remember by association all the functions as they correspond to each key when a desired function is to be performed, which is contrary to the original intention of enhancing the convenience of selecting the various functions. Moreover, if a user fails to recall a given key function, a user manual must be consulted, which further burdens the user.

Accordingly, a simplified and easily operated remote controller that enables the selection of various functions in video equipment is needed.

SUMMARY OF THE INVENTION

Accordingly, it is an object of the present invention to provide a remote control method which displays a menu for each function of a video apparatus onto a display and enables menu selections for various functions by generating a cursor for simplifying the selection operation.

It is another object of the present invention to provide a video apparatus for performing the above remote control method.

To accomplish the above objects of the present invention, there is provided a remote control method for performing a remote control operation using a remote controller, the method comprising the steps of: displaying a cursor on a display screen in response to a movement of the remote controller; displaying a main menu according to a key input of the remote controller while a cursor is displayed on the display screen; selecting the desired main menu by moving the cursor and displaying a sub-menu belonging to the selected main menu while the main menu is displayed on the display screen; selecting the desired sub-menu by moving the cursor and displaying a control menu belonging to the selected sub-menu while the sub-menu is displayed; and performing the corresponding function when the defined function is selected by moving the cursor while the control menu is displayed.

To accomplish another object of the present invention, there is provided a video apparatus including a disk player, the video apparatus comprising: a remote controller including a light emitter for transmitting a first infrared signal in accordance with the key-input, and a location detector for detecting the relative location with respect to the video apparatus according to a second infrared signal which is input; means for detecting the infrared signal from the remote controller and sending the second infrared signal to the remote controller in response to the detected signal; data storage means for storing the cursor and code signals of the main menu, sub-menu and control menu with respect to the function; character information generating means for reading the cursor and the code signal with respect to the menu from the data storage means, to thereby generate character information; image signal processing means for reducing the image signal of the main screen so as to display the image signal onto the region excluding a menu region when the menu is displayed as a predetermined size onto the display; and a system controller for controlling the character signal generating means so as to generate a cursor onto the location of the display in response to a movement of the remote controller according to the first infrared signal transmitted from the remote controller, generating the main menu as character information according to the key input of the remote controller, and generating the sub-menu belonging to the selected main menu and the control menu belonging to the selected main menu and the control menu belonging to the selected sub-menu as character information according to cursor movement.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

The present invention will be explained in more detail with reference to the attached drawings.

Figure 1:
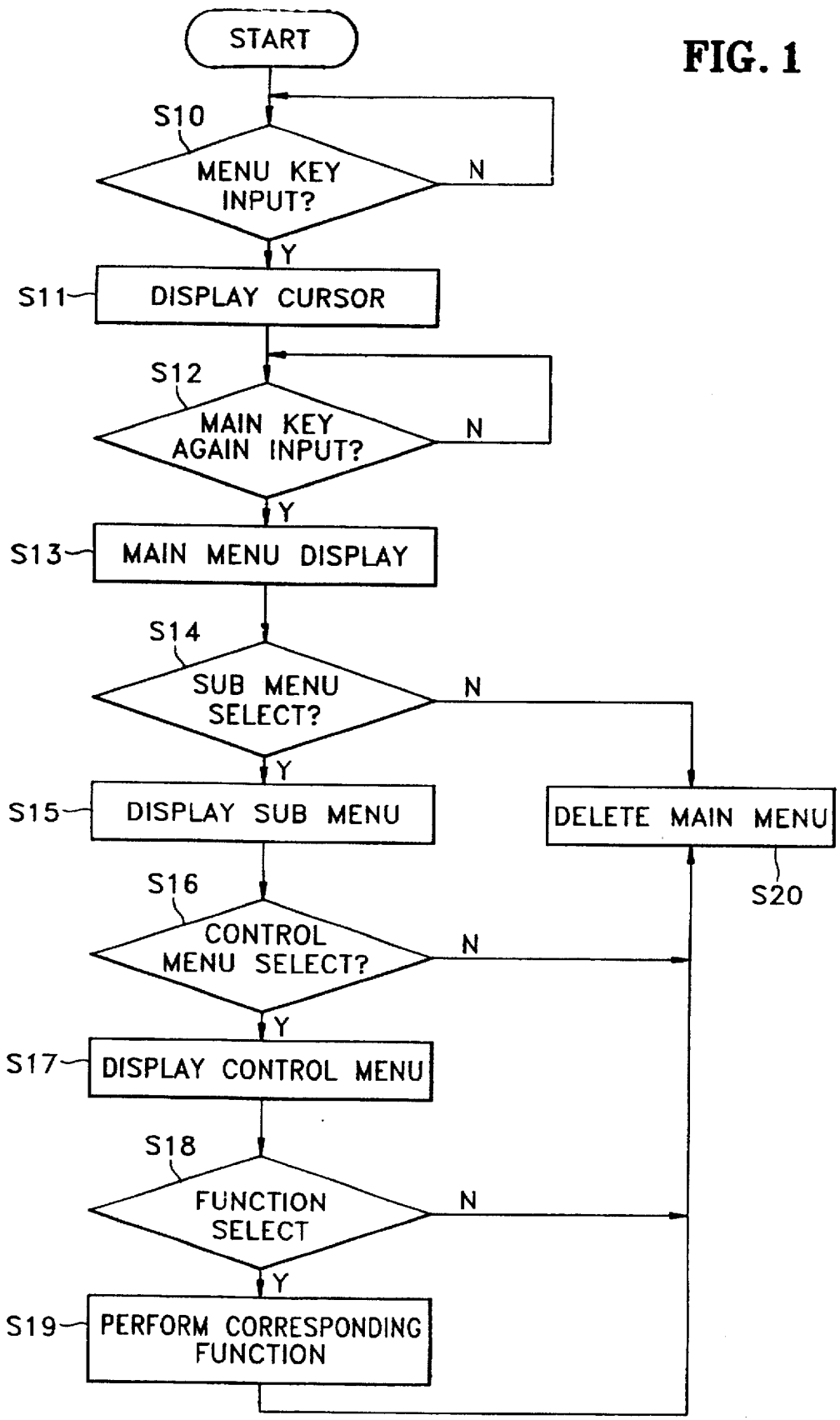
FIG. 1 is a flowchart of an embodiment of a remote control method of the present invention.

FIG. 1 is a flowchart of an embodiment of a remote control method of the present invention.

Referring to FIG. 1, reference numeral 10 denotes a step of displaying a cursor when a menu key provided on a remote controller is pushed a first time; 12 denotes a step of displaying a main menu when the menu key is pushed a second time; 14 denotes a step of displaying the selected sub-menu when the desired sub-menu is selected from the displayed main menu in step 12, by moving the cursor displayed in step 10; 16 denotes a step of displaying a control menu corresponding to the sub-menu selected in step 14; 18 denotes a step of performing the relevant function when a function is selected from the control menu displayed in step 16; and 20 denotes a step of deleting the menu screen when the menu key is input while the cursor is located on the main screen but not within the menu screen, in any one of steps 12, 14, 16 or 18.

When the main menu is displayed in step 12, the main screen of the display is reduced by an equal ratio in width and length. When the menu screen is deleted in step 20, the main screen is enlarged to the size of the original screen.

A remote control method of the present invention shown in FIG. 1 will be explained with reference to the attached FIGS. 2–9 and FIGS. 10A, 10B & 10C.

Figure 2:
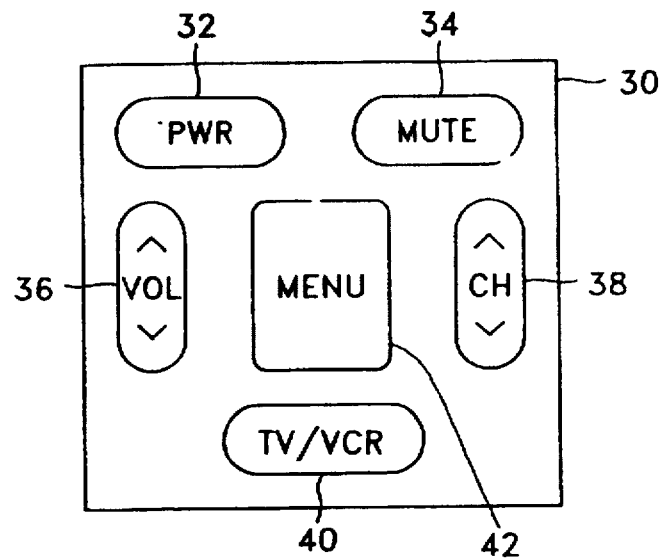
FIG. 2 illustrates keys provided on a remote controller adapted for the present invention.

FIG. 2 illustrates keys provided on a remote controller adopted for the present invention.

Referring to FIG. 2, reference numeral 30 denotes a remote controller, 32 denotes a power key, 34 denotes a mute key, 36 denotes a volume up/down key, 38 denotes a channel up/down key, 40 denotes a TV/VCR select key, and 42 denotes a menu key which performs predetermined functions (steps 10 and 12 of FIG. 1). The number of keys on the remote controller according to the present invention is remarkably reduced as compared with the conventional remote controller, which enables a simplified remote control operation.

Figure 3:
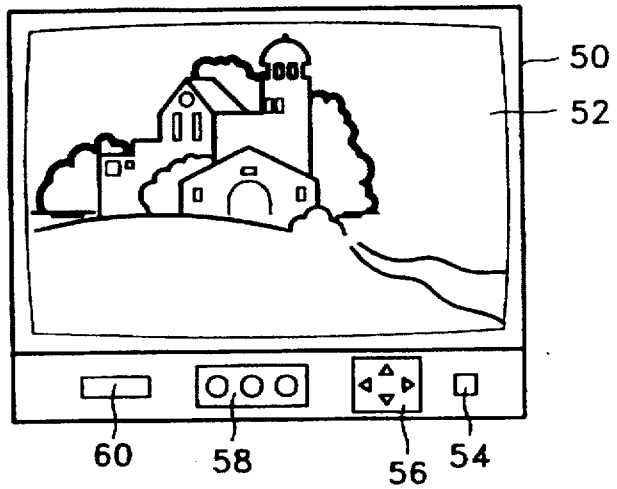
FIG. 3 illustrates an example of the initial screen upon inputting the power key of FIG. 2.

FIG. 3 is an example of a scene of a televised broadcast when power key 32 of FIG. 2 is turned on.

Referring to FIG. 3, reference numeral 50 denotes a television, 52 denotes a main screen of television 50, 54 denotes a power key installed on the television, 56 denotes channel and volume up/down keys wherein the vertically disposed keys are for changing channels and the laterally disposed keys are for volume adjustment, 58 denotes a cursor location light emitting diode, and 60 denotes a pre-amplifier for receiving an infrared signal transmitted from the remote controller. Here, cursor location light emitting diode 58 is for sensing the movement of the cursor in order to display the result, as in U.S. Pat. No. 5,045,843 (publication date: Sep. 3, 1991, inventor: Hansen Perk), the detailed explanation of which is omitted. When cursor location light emitting diode 58 transmits an infrared signal having a predetermined frequency, a remote controller transmits the infrared signal depending on the location of the remote controller with respect to the fixed video apparatus (here, a television set). Then, the television generates an electrical signal in relation to a direction indicated by a user on a display, to thereby move the cursor to the relevant location on the display.

Figure 4:
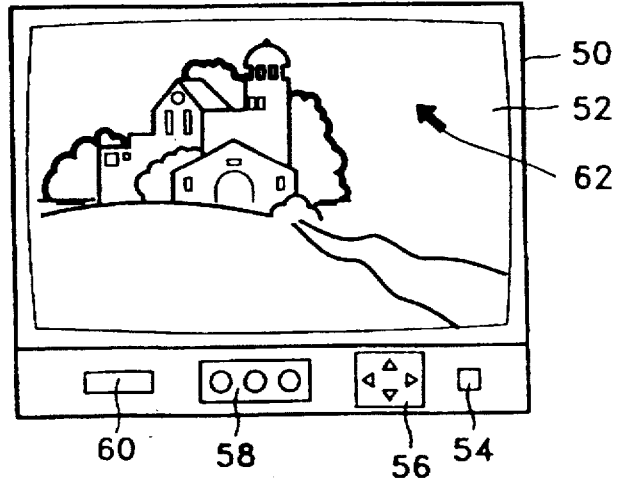
FIG. 4 illustrates a cursor displayed on a screen in the cursor displaying step of the flowchart shown in FIG. 1.

FIG. 4 illustrates a cursor displayed on a screen when step 10 of FIG. 1 is performed. Referring to FIG. 4, reference numeral 62 is a cursor. Here, the principle of generating and moving the cursor is disclosed in the above-mentioned U.S. patent.

Figure 5:
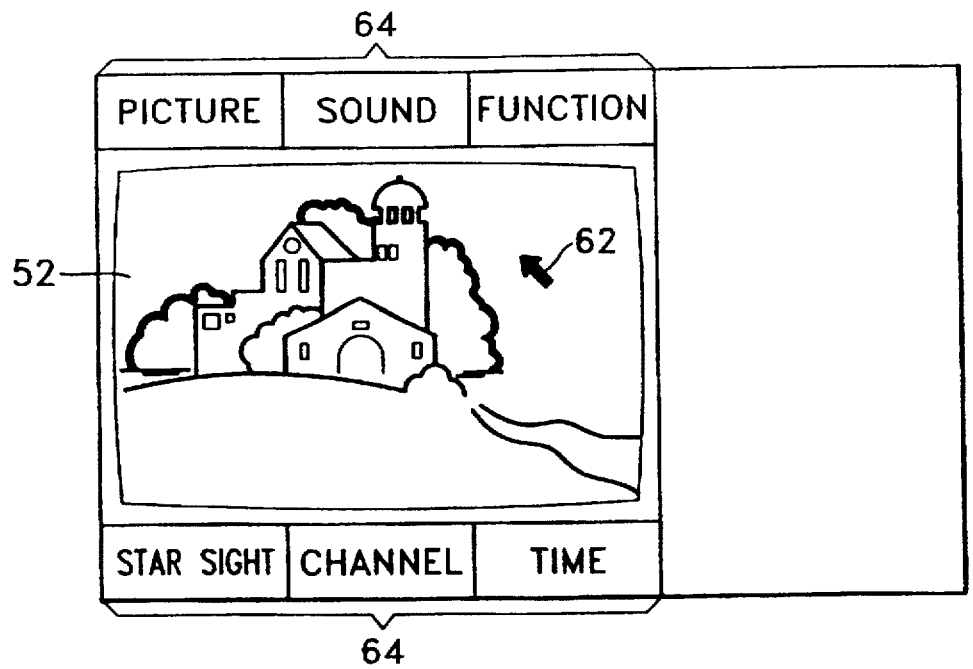
FIG. 5 illustrates an embodiment of the main menu displayed on a screen in the main menu displaying step of the flowchart shown in FIG. 1.

FIG. 5 illustrates a main menu displayed in step 12 of FIG. 1. Referring to FIG. 5, reference numeral 64 denotes that menu key 42 of remote controller 30 of FIG. 2 is pushed again while the cursor 62 is displayed on the screen, as shown in FIG. 4, so that the main screen 52 of FIG. 3 is displayed reduced by an equal ratio in width and in length. Here, the main menu is displayed along the edge of main screen 52.

As shown in FIG. 5, for example, the main menu includes "picture," "sound," "function," "star sight," "channel" and "time." (Here, "star sight" is a reserved program brand name of Star Sight Company.)

Figure 6:
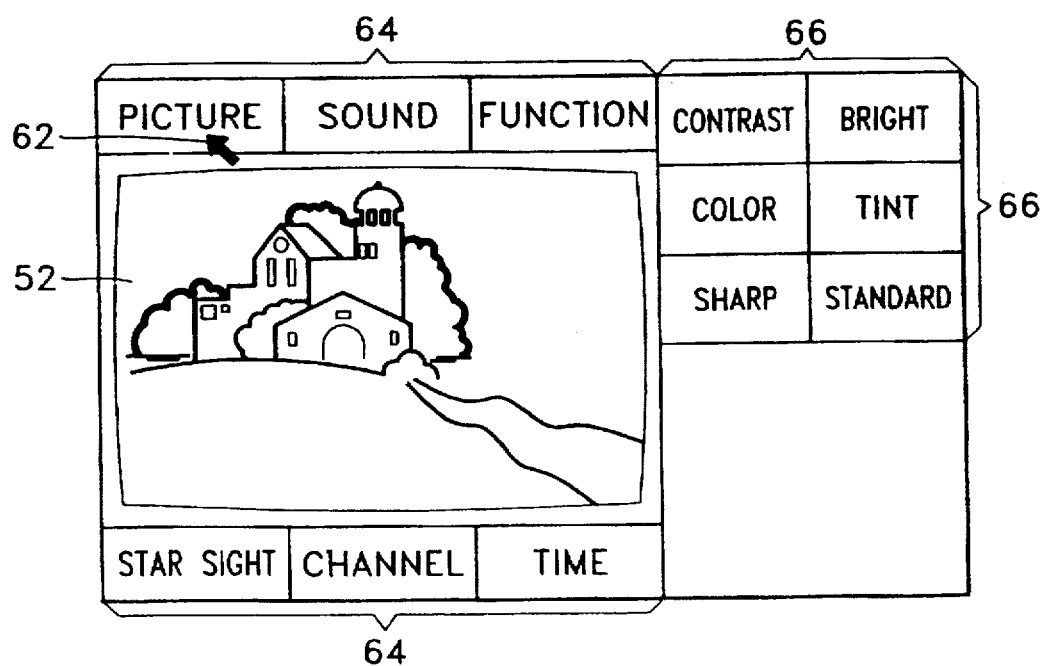
FIG. 6 illustrates an embodiment of the sub-menu within the main menu displayed on a screen in the sub-menu displaying step of the flowchart shown in FIG. 1.

FIG. 6 illustrates the case where cursor 62 is located on the "picture" area of the main menu in order to select "picture" from the main menu.

FIG. 6 illustrates the sub-menu that belongs to the selected main menu displayed onto a screen when sub-menu display step 14 shown in FIG. 1 is performed. Referring to FIG. 6, reference numeral 66 denotes a sub-menu that belongs to the "picture" mode. The sub-menu includes "contrast," "brightness," "color," "tint," "sharpness" and "standard." In addition, FIG. 7 illustrates the case where cursor 62 is located in the "contrast" area of the sub-menu so as to select "contrast" from the sub-menu.

Figure 7:
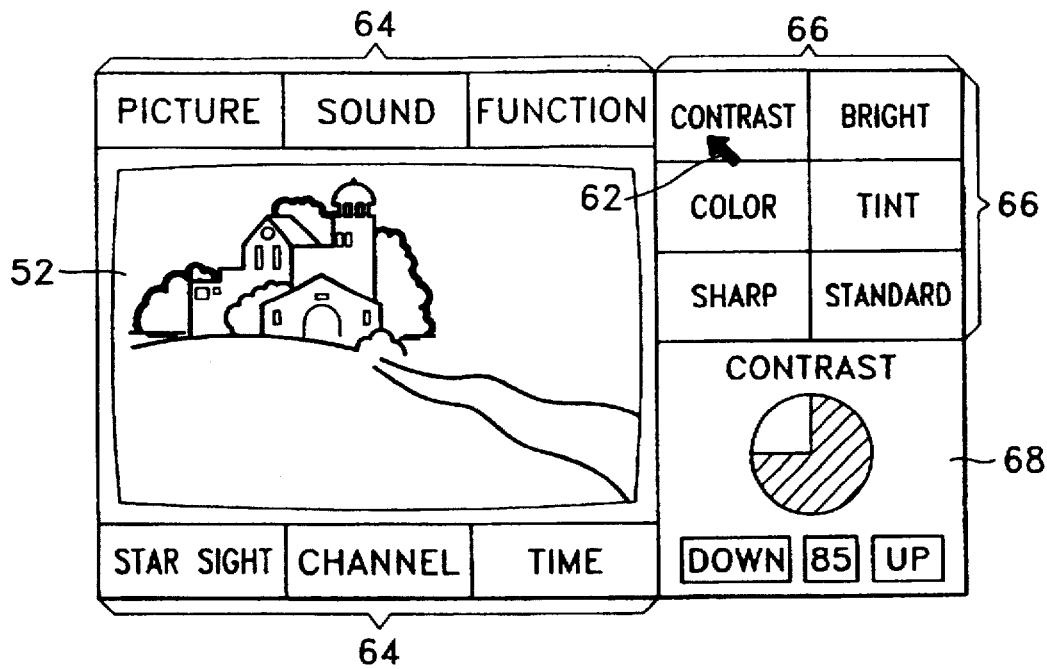
FIG. 7 illustrates an embodiment of the control menu displayed on a screen in the control menu displaying step of the flowchart shown in FIG. 1.

FIG. 7 illustrates the control menu displayed on a screen in step 16 of FIG. 1. Referring to FIG. 7, reference numeral 68 is the control menu that belongs to the selected sub-menu 66.

Figure 8:
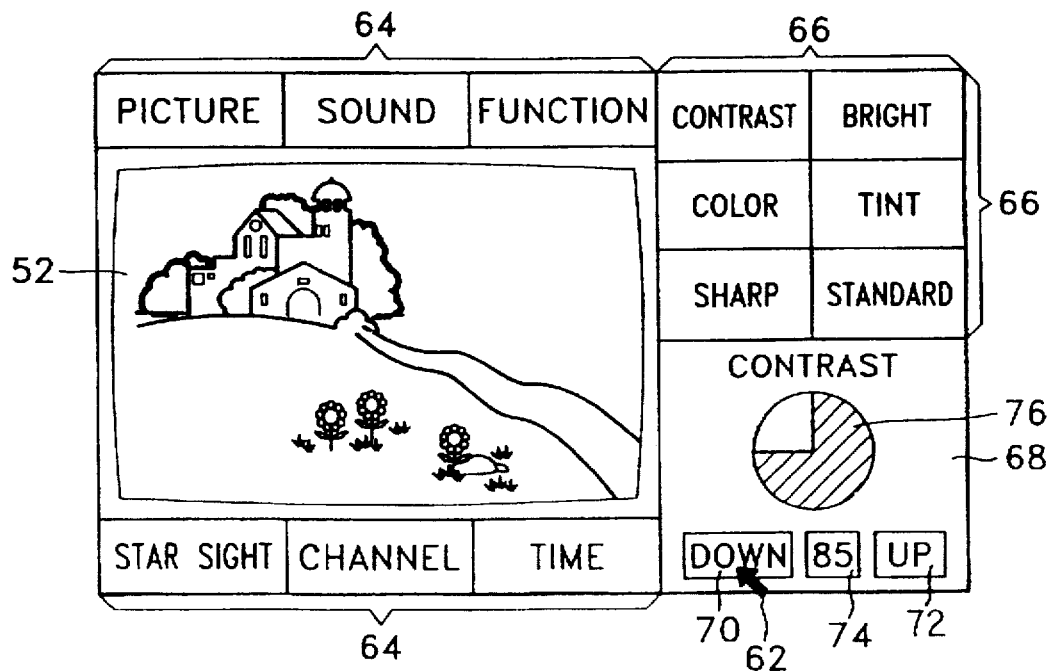
FIG. 8 illustrates the step of performing the relevant function of FIG. 1.

FIG. 8 illustrates the relevant function performing step shown in FIG. 1.

Referring to FIG. 8, reference numeral 70 denotes a menu that steps down the "contrast" of control menu 68 by decremental values, 72 denotes a menu that steps up the "contrast" of control menu 68 by incremental values, 74 denotes a numerical value display for recognizing the degree of "contrast" by a numerical value according to down/up control menus 70 and 72, and 76 denotes a diagram display for recognizing the degree of "contrast" by a diagram, similar to the function of reference numeral 74. The case where cursor 62 is located on "down" menu 70 to select the "down" menu is shown in FIG. 9.

Figure 9:
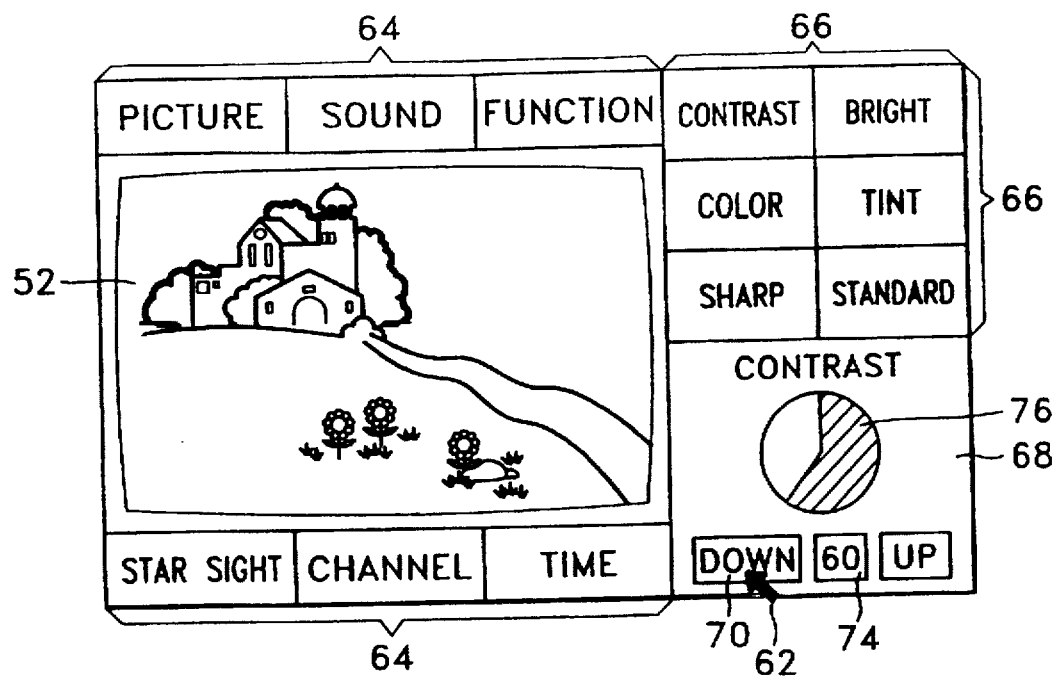
FIG. 9 illustrates a contrast change occurring when a "down" mode is selected in the control menu of FIG. 8.

FIG. 9 illustrates the "contrast" change when the down mode of the control menu is selected.

The reference numerals of FIG. 9 are the same as those of FIG. 8, and thus explanation therefor is omitted. Referring to FIG. 9, the numerical value of numeral display 74 is stepped down, and diagram display 76 displays the "contrast" being stepped downed when "down" menu 70 is selected. As a result, the "contrast" of main screen 52 is decreased by steps.

Figure 10A:
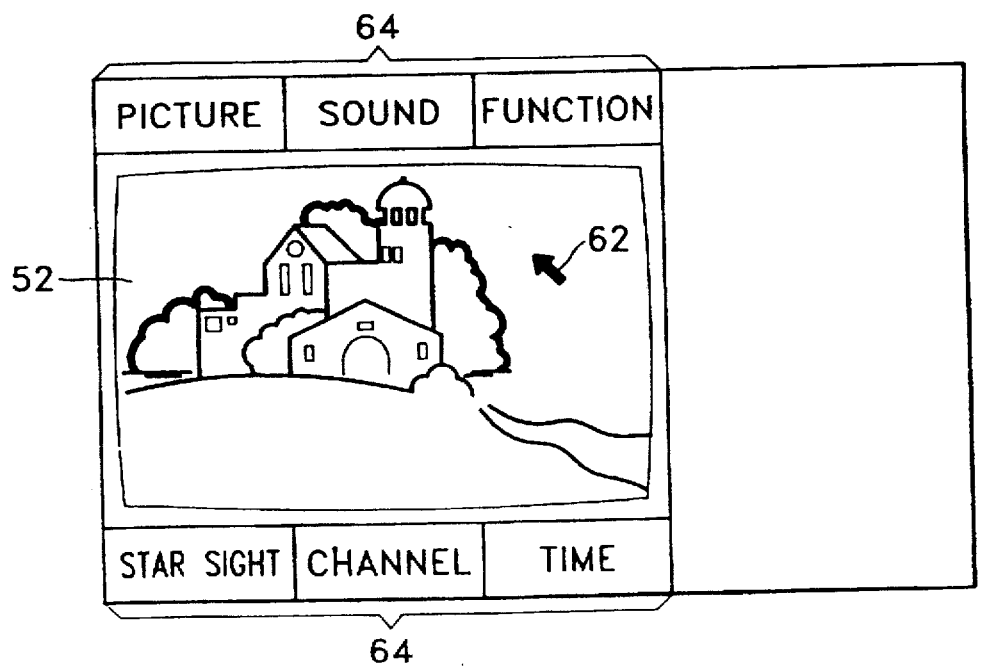
FIGS. 10A, 10B and 10C illustrate the menu screen deleting step of the flowchart shown in FIG. 1.
Figure 10B:
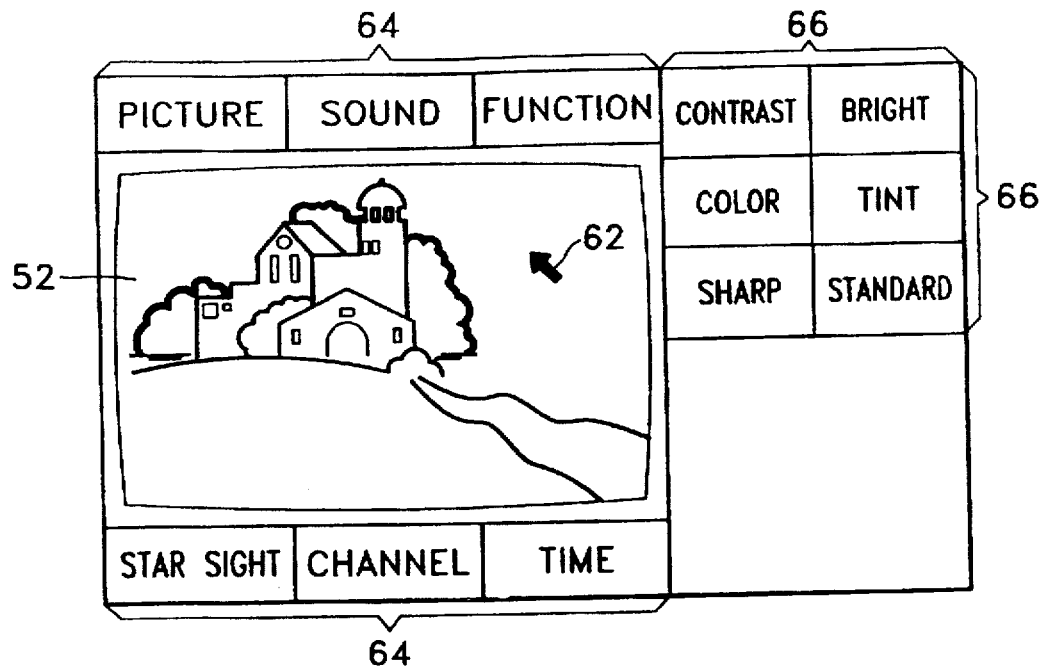
Figure 10C:
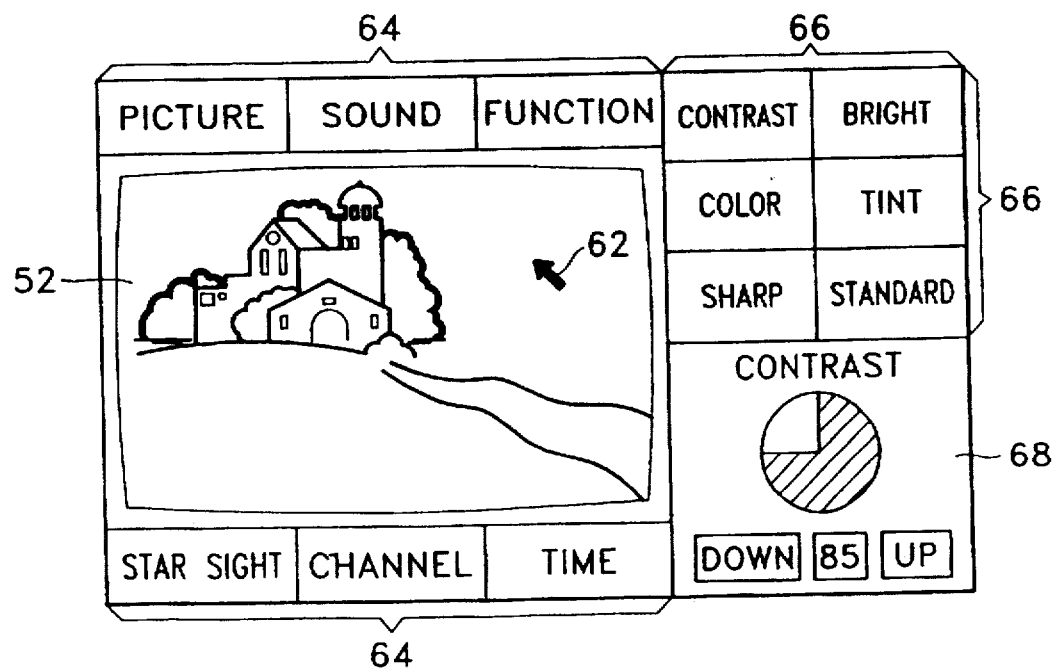

FIGS. 10A, 10B and 10C illustrate the main screen deleting step shown in FIG. 1.

Referring to FIG. 10A, cursor 62 is moved to main screen 52 in the main menu displaying step (FIG. 5 showing step 12 of FIG. 1) or a predetermined time is elapsed, which returns to the main screen shown in FIG. 3. Referring to FIG. 10B, cursor 62 is moved to main screen 52 in the sub-menu displaying step (FIG. 6 showing step 15 of FIG. 1) or when a predetermined time has elapsed, as shown in FIG. 3. Referring to FIG. 10C, cursor 62 is moved to main screen 52 in the control menu displaying step (FIG. 7 showing step 17 of FIG. 1) or when a predetermined time has elapsed, as shown in FIG. 3. In addition, FIG. 10C depicts a return of the cursor 62 to the main screen in a function performing step (FIG. 8 showing step 19 of FIG. 1).

Thus far, the method for performing a remote control operation for function selection relates to a television set. Meanwhile, the TV/VCR select key of remote controller 30 can be changed to the "VCR" mode in order to select the functions related to a videocassette recorder.

Figure 11:
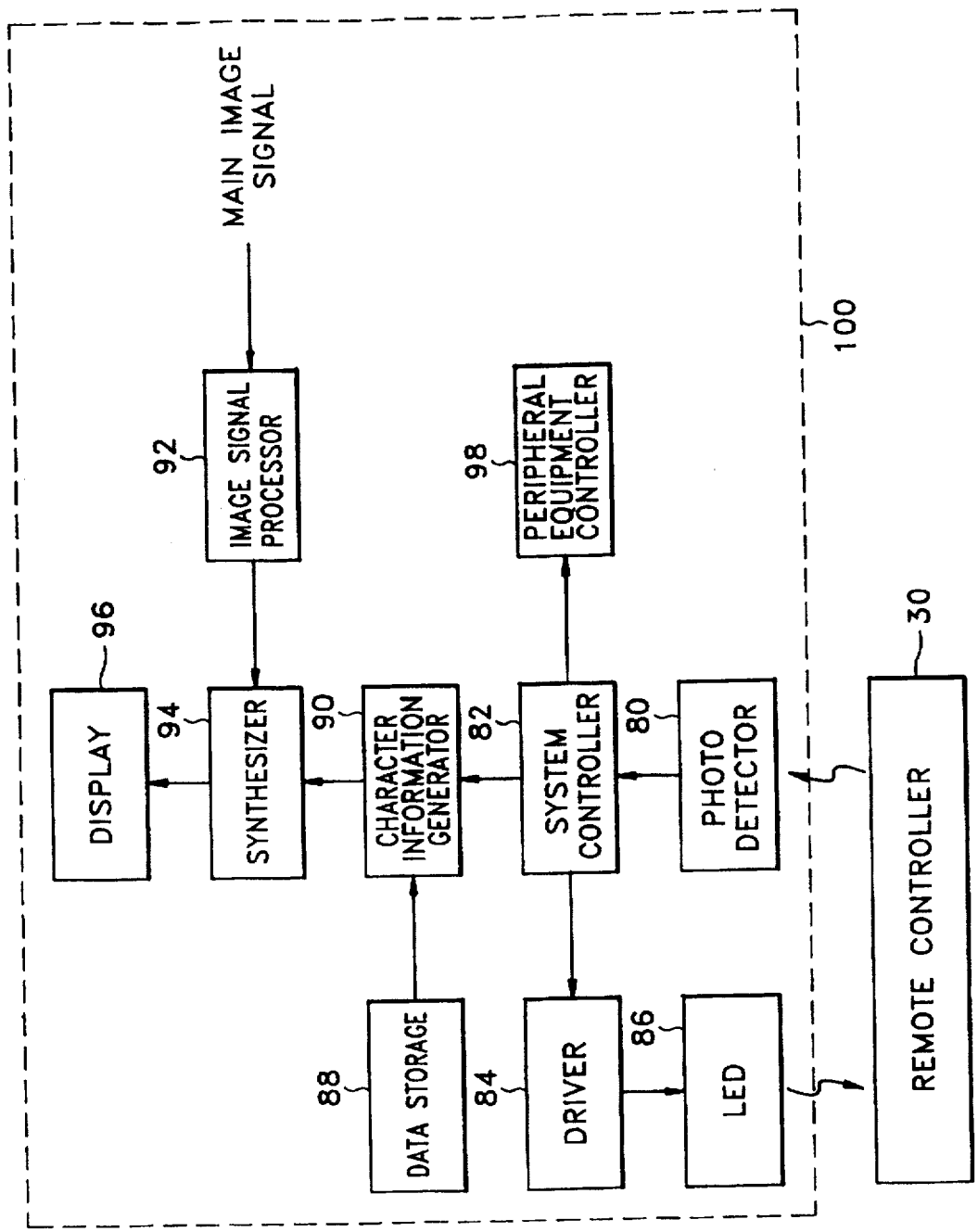
FIG. 11 is a block diagram showing a television being controlled by the remote control method according to the present invention.

FIG. 11 is a block diagram showing a television performing a remote control method of the present invention.

Referring to FIG. 11, reference numeral 30 denotes a remote controller, 80 denotes a photo-detector, 82 denotes a system controller, 84 denotes a driver, 86 denotes a cursor location light emitting diode (LED), 88 denotes data storage means, 90 denotes a character information generator, 92 denotes an image signal processor, 94 denotes a synthesizer, 96 denotes a display, 98 denotes a peripheral equipment controller, and 100 denotes a television set.

The device shown in FIG. 11 operates as follows.

When the menu key provided on remote controller 30 is input once by a user, remote controller 30 transmits an infrared signal according to the key input. Then, photo-detector 80 detects the infrared signal and outputs the detected result to system controller 82.

Driver 84 drives the infrared signal having a predetermined frequency to be transmitted from cursor location light emitting diode 86 under the control of system controller 82, and a location sensor (not shown) of remote controller 30 senses the result. The sensor signal indicating the movement (location) of remote controller 30 is transmitted as an infrared signal from the LED of remote controller 30. Here, the detailed constitution and operation of remote controller 30 are disclosed in the above-mentioned U.S. patent.

Photo-detector 80 detects the infrared signal having a remote control location information transmitted from remote controller 30 and outputs the result to system controller 82. Then, system controller 82 generates a control signal and outputs the result to character information generator 90. Then, the cursor generated from character information generator 90 is displayed on display 96.

When the menu key provided on remote controller 30 is input again, system controller 82 recognizes the second input of the menu key and controls character information generator 90 so as to display the main menu. Then, the user moves the cursor to select the menu of the desired function.

Meanwhile, data storage means 88 stores code signals such as main menu, sub-menu and control menu of a videocassette recorder or laser disc player which can be connected to the television, as well as the cursor and code signals such as main menu, sub-menu and control menu of the television.

In addition, there are two ways for performing a remote control of the function selection for a videocassette recorder. The first one involves selecting the VCR function after performing a mode conversion by employing the TV/VCR select key of remote controller 30. The second one utilizes peripheral equipment controller 98 controls so as to select the VCR connected to a television by a cable and a function is selected when an external device select menu is selected by employing a cursor on the main menu. A remote control can be performed on an external device, for example, a laser disc player, by employing the above-described second method. That is, peripheral device controller 98 controls the videocassette recorder and laser disc player connected to the television under the control of controller 82. Thus, the functions of each device can be selected via the displayed menu.

Character information generator 90 generates the code signal stored in data storing means 88 and a graphics signal and a cursor signal of the main menu, sub-menu and control menu according to the control command of controller 82. Character information generator 90 can be titled as a cursor and graphic controller or as an on screen display (OSD).

Image signal processor 92 compresses the image signal with respect to the main screen to a predetermined size as shown in FIG. 4 when the menu key of remote controller 30 is pushed twice, and displays the result on display 96. When the main screen cannot be compressed sections are cut from the original screen to fit the region of the predetermined sized main screen shown in FIG. 4, to thereby display only a partial image.

Synthesizer 94 synthesizes the character information (menu) generated from character information generator 88 with the main screen signal processed in image signal processor 92 and displays the result on the screen of display 96.

As described above, in the remote control method and video apparatus for performing the same, the number of keys of a remote controller is greatly reduced, and the controlling of the video apparatus is simplified accordingly.

What is claimed is:

1. A remote control method for performing a remote control operation using a remote controller, said method comprising the steps of:

displaying an image signal on a main region of a display screen;

displaying a cursor on the display screen in response to a movement of the remote controller;

displaying a main menu according to a key input of the remote controller while a cursor is displayed on the display screen;

selecting a desired main menu function by moving the cursor;

displaying a sub-menu belonging to the desired main menu function while the main menu is displayed on the display screen;

selecting a desired sub-menu function by moving the cursor;

displaying a control menu belonging to the desired sub-menu function while the sub-menu is displayed;

performing a control function by moving the cursor to a corresponding control area while the control menu is displayed; and reducing the main region of the display screen, when a menu is displayed, so as to display the image signal onto a region of the display screen which has a predetermined size and which excludes a menu region.

2. A remote control method according to claim 1, further comprising the step of terminating the display of one of the main menu, the sub-menu and the control menu when the main region is selected by the cursor in any one of said main menu displaying step, sub-menu displaying step, control menu displaying step and control function performing step wherein the step of terminating the display is Performed by pressing a menu key while the cursor is displayed on the display screen.

3. A remote control method according to claim 2, wherein the main region is enlarged to the original screen size when the display of one of the main menu, the sub-menu and the control menu is terminated in said terminating step.

4. A video system including a display, said video system comprising:

a video apparatus;

a remote controller including a light emitter for transmitting a first infrared signal in accordance with a key-input, and a location detector for detecting a relative location with respect to the video apparatus according to a second infrared signal;

means for detecting the first infrared signal transmitted from the remote controller and sending the second infrared signal to the remote controller in response to the detected first infrared signal;

data storage means for storing a cursor signal and code signals of a main menu, a sub-menu and a control menu according to function;

character information generating means for reading the cursor signal and at least one of the code signals from said data storage means, to thereby generate character information;

image signal processing means for reducing an image signal applied to a main screen of the display so as to display the image signal onto a region of the display having a predetermined size and which excludes a menu region when a menu is displayed; and a system controller for controlling the character information generating means to generate a cursor onto a location of the display in response to a movement of the remote controller according to the first infrared signal transmitted from said remote controller, and to generate the main menu as character information according to the key input of said remote controller, and to generate the sub-menu belonging to a selected main menu and the control menu belonging to the selected sub-menu as character information according to cursor movement.

5. A video system according to claim 4, further comprising an external device controller that selects a second video apparatus connected to said video apparatus, so as to control at least one function of said second video apparatus by a menu when said another video apparatus is selected by a cursor from an external device select menu on the display.

6. A remote control method for performing a remote control operation using a remote controller, said method comprising the steps of:

displaying an image signal on a main region of a display screen;

displaying a cursor on the display screen in response to a movement of the remote controller;

displaying a main menu according to a key input of the remote controller while a cursor is displayed on the display screen;

selecting a desired main menu function by moving the cursor while the main menu is displayed on the display screen;

; and reducing the main region of the display screen, when the main menu is displayed, so as to display the image signal onto a region of the display screen which has a predetermined size and which excludes a menu region.

* * * * *